United States Patent
O'Keeffe et al.

(10) Patent No.: US 6,184,311 B1
(45) Date of Patent: *Feb. 6, 2001

(54) POWDER COATING COMPOSITION OF SEMI-CRYSTALLINE POLYESTER AND CURING AGENT

(75) Inventors: Luke James O'Keeffe; Steven Alistair Nixon; Colin Cameron, all of Newcastle upon Tyne; Alan Keith Penman, Tyne & Wear, all of (GB)

(73) Assignee: Courtaulds Coatings (Holdings) Limited, London (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/446,075

(22) Filed: May 19, 1995

Related U.S. Application Data

(63) Continuation of application No. 08/327,444, filed on Oct. 21, 1994, now abandoned, which is a continuation of application No. 07/927,436, filed on Sep. 25, 1992, now abandoned.

(30) Foreign Application Priority Data

Mar. 26, 1990 (GB) .................................................. 9006737
Mar. 26, 1991 (WO) ................................. PCT/GB91/00450

(51) Int. Cl.[7] .............................. B05D 3/02; B32B 27/36; C08L 63/00; C08L 67/03
(52) U.S. Cl. ...................... 525/438; 427/385.5; 427/386; 427/388.2; 428/413; 428/418; 428/458; 428/480; 525/437; 525/444; 525/448; 525/440; 525/934
(58) Field of Search ....................................... 525/438, 440, 525/934, 437, 444, 448; 528/272, 296, 297; 427/385.5, 386, 388.2; 428/413, 418, 458, 480

(56) References Cited

U.S. PATENT DOCUMENTS

| | | | |
|---|---|---|---|
| 4,094,721 | * 6/1978 | Sturm et al. .......................... | 528/302 |
| 4,217,426 | 8/1980 | McConnell .......................... | 525/173 |
| 4,340,519 | * 7/1982 | Kotera et al. ........................ | 523/414 |
| 4,340,698 | 7/1982 | De Jongh et al. .................... | 525/438 |
| 4,352,924 | * 10/1982 | Wooten et al. ...................... | 525/440 |
| 4,387,214 | 6/1983 | Passmore et al. ................... | 528/296 |
| 4,442,270 | 4/1984 | Passmore et al. ................... | 525/440 |
| 4,499,239 | 2/1985 | Murakami et al. .................. | 525/111 |
| 4,740,580 | 4/1988 | Merck et al. ........................ | 528/272 |
| 4,801,680 | * 1/1989 | Geary et al. ......................... | 528/296 |
| 4,859,760 | * 8/1989 | Light, Jr. et al. .................... | 525/440 |
| 4,973,646 | * 11/1990 | Witzemann et al. ................ | 525/440 |
| 4,975,513 | * 12/1990 | Kim et al. ............................ | 528/285 |
| 5,321,100 | * 6/1994 | Belder et al. ........................ | 525/438 |

FOREIGN PATENT DOCUMENTS

| | | |
|---|---|---|
| 614 733 | 12/1979 | (CH) . |
| 0 201 168 | 12/1986 | (EP) . |
| WO 89/05320 | 6/1989 | (EP) . |
| 0 322 807 | 7/1989 | (EP) . |
| 0 322 827 | 7/1989 | (EP) . |
| 1 489 485 | 10/1977 | (GB) . |
| 62-240368 | 10/1987 | (JP) . |

OTHER PUBLICATIONS

Polyestery jejich výroba a zpracování, Praha 1978, SNTL–Nakladatelstvi Technicke Literatury.*

* cited by examiner

Primary Examiner—Robert E. L. Sellers
(74) Attorney, Agent, or Firm—Nixon & Vanderhye

(57) ABSTRACT

A thermosetting powder coating composition according to the present invention comprises as binder a co-reactable particulate mixture of a carboxylic acid-functional polyester component and a curing agent having groups reactive with carboxylic acid groups, characterized in that the carboxylic acid-functional component comprises a semi-crystalline polyester having an acid value of from 10 to 70 mg KOH/g and a hydroxy value of no more than 11 mg KOH/g. Generally the semi-crystalline polyester has one or more Tg values less than 55° C., a sharp melting point of 50 to 200° C. and preferably a number average molecular weight of at least 1600. The composition may, if desired, include an amorphous polyester and the curing agent may be, for example, an epoxy resin or a bis(beta-hydroxyalkylamide).

19 Claims, No Drawings

POWDER COATING COMPOSITION OF SEMI-CRYSTALLINE POLYESTER AND CURING AGENT

This is a File Wrapper continuation of application Ser. No. 08/327,444, filed Oct. 21, 1994, now abandoned, which is a Rule 62 File Wrapper Continuation of application Ser. No. 07/927,436, filed Sep. 25, 1992, now abandoned.

This invention relates to powder coating compositions based on a thermosetting resin which can be applied to a substrate, for example by electrostatic spray, and can be heated on the substrate to cause the resin to melt and flow and to cure the resin to a hard tough film. Powder coatings are known to provide a number of advantages over their liquid counterparts. Powder is completely free of solvent which has to be removed after paint application and is applied in one coat, with any powder not reaching the substrate being collected and re-used, and the coatings provide excellent corrosion resistance and outdoor-durability.

Powder coatings based on carboxylic acid group-containing amorphous polyesters with glass transition temperature (Tg) in the range 30–100° C., preferably 40–75° C., and a curing agent such as triglycidyl isocyanurate are widely used. They are stable during storage and form coating films of excellent corrosion resistance and outdoor-durability. There is, however, a danger with such powder coatings of onset of the cure reaction before the polyester is in a sufficiently molten and mobile state. This can cause surface appearance defects such as "orange peel" texture. There is a need for thermosetting powder coatings which will melt and flow on the substrate more readily at the temperatures used for curing powder coatings, which are typically in the range 140–225° C.

Powder compositions designed to offer high outdoor-durability coatings often contain amorphous polyesters which are resistant to ester hydrolysis. This is achieved to a large extent when isophthalic acid is used on its own or in combination with other diacids to form the required polyesters. A problem often found when such polyesters are incorporated into powder compositions, however, is that the resultant coatings are very intolerant of mechanical deformation, with direct impact in particular often causing tearing or even delamination of the coating. Moreover, the curing time of these powders is often longer than that required for powders not based on polyesters with a high isophthalic acid content. There is a need, therefore, for powder compositions based on isophthalic acid-rich polyesters which offer faster thermal cure and provide coatings which have both high outdoor-durability and increased resistance to mechanical deformation.

The so-called "hybrid" powder coatings, i.e. those based on carboxylic acid group-containing, amorphous polyesters and epoxy resins, provide coatings having excellent corrosion resistance, flexibility, hardness and solvent resistance. There is a need, however, for hybrid powders which can be thermoset over a wide range of temperatures (e.g. 160° C. to 200° C.), affording thin film (for example 40–50 microns) coatings with consistency both in their appearance and in mechanical performance.

EP-A-322827 describes a thermosetting powder coating composition comprising a co-reactable particulate mixture of: (a) a carboxylic acid group-containing acrylic polymer having a Tg in the range of 35° C. to 100° C.; (b) a crystalline carboxylic acid group-containing polyester having a number average molecular weight from 300 to 1,500 and an acid equivalent weight of 150 to 750 (acid value about 375 to 75 mg KOH per gram); and (c) a beta-hydroxyalkylamide, the ratio of beta-hydroxyalkylamide equivalents to carboxylic acid equivalents being within the range 0.6 to 1.6:1.

EP-A-322807 describes a thermosetting powder coating composition comprising a co-reactable particulate mixture of: (a) a carboxyl group-containing acrylic or polyester polymer having a Tg in the range 35° C. to 100° C.; (b) a polyepoxide, and (c) a beta-hydroxyalkylamide. The composition can also contain a carboxyl group-containing crystalline polyester with a number average molecular weight of from 300 to 1500 and an acid equivalent weight of from 150 to 750 (acid value 375 to 75). The crystalline polyester if used is present at 0 to 25 per cent by weight. It is asserted that amounts greater than 25 per cent by weight based on total resin solids are undesirable because of powder stability problems.

U.S. Pat. No. 4,217,426 describes melt blends of semi-crystalline polyesters with certain polyethylene to provide material that is readily grindable by cryogenic grinding techniques for use in powder coating compositions. The semi-crystalline polyesters have an inherent viscosity ranging from about 0.4 to 1.2, a melting point of about 80 to 155° C. and an apparent heat of fusion of no more than 10 calories/gram and contain from 100 to 60 mole % terephthalic acid, 0 to 40 mole % isophthalic acid, 100 to 35 mole % 1,6-hexanediol and 0 to 65 mole % 1,4-butanediol.

WO-A-89/05320 describes a polyurethane powder coating composition comprising (a) 10–80 weight % of at least one amorphous polyester containing free hydroxyl groups and having a Tg of greater than 40° C., a hydroxyl number of 20,200, and an inherent viscosity of 0.1–0.5; (b) 10–80 weight % of at least one semi-crystalline polyester containing free hydroxyl groups and having a Tg of –10 to 50 ° C., a number average molecular weight of 500–10,000, a heat of fusion of greater than 5 calories per gram, a hydroxyl number of 20–200, and an inherent viscosity of 0.1–0.5; and (c) 5–30 weight % of a polyisocyanate crosslinking agent. In order to bestow easier and safer handling properties, such a curing agent is adducted with caprolactam which volatilises from the applied powder at about 160° C. and allows the curing reaction to commence. The emission of volatile organic species such as caprolactam, however, is seen as undesirable by many powder applicators and limits sales of polyisocyanate-cured powders in many countries. Crosslinking agents designed for use in powders containing carboxylic acid group-functional polyesters generally do not involve release of noxious materials during stoving.

A thermosetting powder coating composition according to the present invention comprises as binder a co-reactable particulate mixture of a carboxylic acid-functional polyester component and a curing agent having groups reactive with carboxylic acid groups, characterised in that the carboxylic acid-functional component comprises at least 5% by weight of a semi-crystalline polyester having generally an acid value of from 10 to 70 mg KOH per gram.

More especially the carboxylic acid-functional component comprises:
  (A) 5–100% by weight of at least one semi-crystalline polyester having an acid value of from 10 to 70 mg KOH per gram and a hydroxy value of no more than 11 mg KOH per gram, and
  (B) 0–95% by weight of at least one amorphous polyester having a Tg of at least 30° C. and an acid value of 15 to 90, preferably 15 to 70, mg KOH per gram.

The semi-crystalline polyester is generally characterised by having one or more Tg values no more than 55° C. and a sharp melting point which is preferably in the range 50° C. to 200° C.

When an amorphous polyester is used the amount of amorphous polyester is preferably 10–95%, especially 40–90%, for example 60–90%, by weight and the amount of semi-crystalline polyester used is preferably 5–90%, especially 10–50%, for example 10–40%, by weight.

Powder coatings are usually formulated with amorphous polyesters which have a Tg greater than 30° C., preferably at least 45° C., to allow good storage stability of the powders. Coatings based on amorphous polyesters with a Tg lower than 45° C. tend to agglomerate when stored at ambient temperature. However, the flow of the polymer when molten tends to vary with its Tg in that polymers with a high Tg (greater than 70° C., for example) can have poor flow and afford coatings with an "orange peel" texture.

We have found that carboxylic acid group-containing, semi-crystalline polyesters which have a Tg less than 45° C. can be used according to the invention in storage-stable powders. These semi-crystalline polyesters also provide coatings free of "orange peel" and with excellent overall appearance. The semi-crystalline polyesters proposed by this invention can be used in place of, or as a supplement to those carboxylic acid group-containing amorphous polyesters commercially available and commonly used in powder coating compositions.

The semi-crystalline polyester differ further from conventional amorphous polyesters as used in powder coatings in that semi-crystalline polyesters have a heterogeneous morphology (i.e. they contain a mixture of phases), are usually opaque and white in colour at room temperature and, in addition to their relatively low melt viscosities, are much more insoluble in common organic solvents, for example xylene, white spirit and ketones, than their amorphous counterparts. The semi-crystalline polyesters generally have a high degree of structural regularity (i.e. chemical, geometrical and/or spatial symmetry).

The semi-crystalline polyester has an acid value of at least 10 mg KOH per gram to ensure that it is able to be adequately cured, most preferably at least 28 mg KOH per gram. It preferably has an acid value of not more than 70, most preferably not more than 45. Preferably also, it has a hydroxy value of no more than 11 mg KOH per gram, more especially no more than 5 mg KOH per gram. The number average molecular weight Mn of the semi-crystalline polyester is preferably at least 1600 so that it can contribute to the toughness of the coating. Molecular weights Mn of at least 2500 are particularly preferred, especially when the semi-crystalline polyester is to be used as the only carboxylic acid-functional polyester or as a major ingredient (more than 30% by weight) of the carboxylic acid-functional polyester component. The Mn of the semi-crystalline polyester is preferably not more than 12000, most preferably not more than 4500. Mns of up to 4000 should especially be mentioned.

Accordingly, the present invention provides a semi-crystalline polyester for use in thermosetting powder coatings with one or more Tg values no more than 55° C., a sharp melting point of 50° C. to 200° C., an acid value of from 10 to 70 mg KOH per gram, a hydroxy number of no more than 11 mg KOH per gram, and preferably a number average molecular weight of at least 1600.

The semi-crystalline polyesters of this invention are based on a polycondensation reaction of (cyclo)aliphatic and/or aromatic polyols with (cyclo)aliphatic and/or aromatic polycarboxylic acids or anhydrides, esters or acid chlorides based on these acids, using an excess of acid over alcohol so as to form a polyester with an acid number of at least 10 mg KOH per gram, preferably from about 10 to about 70 mg KOH per gram, and more preferably from about 28 to about 45 mg KOH per gram, and with a hydroxyl number preferably no more than 11 mg KOH per gram. Examples of suitable polyols include 1,2-ethanediol, 1,3-propanediol, 1,4-butanediol, diethylene glycol, 1,6-hexanediol, neopentyl glycol, 1,10-decanediol, 1-4-cyclohexanedimethanol, trimethylolpropane, 2-methylpropan-1,3-diol, hydrogenated bisphenol A (or 2,2-(dicyclohexanol)propane), 2,2,4-trimethyl-1,3-pentanediol, 2-n-butyl-2-ethyl-1,3-propanediol and 3-hydroxy-2,2-dimethylpropyl 3-hydroxy-2,2-dimethylpropanoate (CA, Reg. No.=115-20-4). Suitable polycarboxylic acids which may be used include succinic acid, adipic acid, azelaic acid, sebacic acid, 1,12-dodecanedioic acid, terephthalic acid, isophthalic acid, trimesic acid, tetrahydrophthalic acid, hexahydrophthalic acid, 1,4-cyclohexanedicarboxylic acid, trimellitic acid and paththalene dicarboxylic acid.

The present invention further provides a process for the preparation of a semi-crystalline polyester for use in thermosetting powder coatings, by polycondensation between one or more suitable polyols and one or more suitable polycarboxylic acid components selected from acids, anhydrides, esters and acid halides, characterised in that excess of acid over alcohol is used to give a product having an acid value of from 10 to 70 mg KOH/g and a hydroxy value of no more than 11 mg KOH/g.

For the formation of polyesters with significant crystallinity it is preferred but not essential that the polycarboxylic acids and polyols used in the polycondensation reaction contain an even number of carbon atoms. The use of aromatic and/or aliphatic cyclic reagents symmetrically substituted, for example terephthalic acid, 1,4-cyclohexanedicarboxylic acid or 1,4-cyclohexanedimethanol, in particular tends to promote crystallinity. Such reagents may however ten to produce semi-crystalline polyesters having a melting point higher than the usual curing temperature of thermosetting polyester powder coatings; it may be preferred to use them in conjunction with a diol of the formula $HO(CH_2)_nOH$ or a dicarboxylic acid of the formula $HOOC(CH_2)_nCOOH$ where n is an even number from 2 to 12 inclusive, for example 6, 8, 10 or 12, to produce a semi-crystalline polyester having a melting point below 200° C. and preferably below 180° C.

In preparing the carboxyl group-containing semi-crystalline polyesters, the various polyols and polyacids can be mixed together and reacted by conventional polycondensation processes. The reaction may be conducted with the various monomers in hot melt (optionally in a pressurised reactor to accelerate the reaction) or in a suitable solvent. A catalyst, such as dibutyltin oxide, can be used to accelerate the polycondensation reaction. The monomer ingredients used in the synthesis of the semi-crystalline polyesters for this invention are advantageously reacted together at an equivalent ratio of polyol to polyacid of from about 0.86:1.00 to about 0.98:1.00, preferably at about 0.92:1.00, so as to control the molecular weight in the range 2,500 to 4,500 (number average).

The reaction can be carried out in two stages if desired. For example, a dicarboxylic acid can be reacted with an excess of diol in the first stage to produce a hydroxy-tipped polyester and this can be further reacted with a dicarboxylic acid to produce the acid-functional semi-crystalline polyester. Different dicarboxylic acids can be used in the two stages if desired, for example an aromatic or cycloaliphatic acid can be used in the first stage followed by an aliphatic acid in the second stage.

Preferable monomers for use in the synthesis of the semi-crystalline polyesters of this invention include those which contain an even number of carbon atoms, e.g. terephthalic, isophthalic, adipic and succinic acids, 1,6-hexanediol, 1,4-butanediol, 1,2-ethanediol and 1,4-cyclohexanedimethanol. This does not, however preclude the use of monomeric polyacids or polyols containing an odd number of carbon atoms or the use of certain experimental techniques known to promote crystallinity in polymers, e.g. maintaining the polyester product at a temperature mid-way between its Tg and melting point (Tm) for a period of time or conducting the synthesis in (or treating the final polyester with) a high boiling organic solvent such as 1,3-dichlorobenzene or diphenylether so that the polyester is maintained above its Tm for a period of time before being allowed to cool to ambient temperature. These and other techniques for promoting crystallinity in carboxylic acid group-containing polyesters may be used alone or in combination.

The semi-crystalline polyesters are solid at room temperature and generally have at least one glass transition temperature (Tg value) below 55° C., generally between −20° C. and 50° C., preferably from about −15° C. to about 40° C. These phase changes and the percentage crystallinity in the polyester are detectable by Differential Scanning Calorimetry (D.S.C) as described in "Encyclopaedia of Polymer Science and Engineering", Volume 4, pages 482–519, 1986 (Wiley Interscience). Examined by D.S.C. The semi-crystalline polyester may exhibit two glass transitions, one of which is attributable to a freely mobile, amorphous region in the polyester and the other to an amorphous region where motion is constrained by adjacent crystallites. Both Tg values, however, generally lie within the temperature range of about −20° C. to about 55° C. The semi-crystalline polyester preferably has a melting point of below 180° C., and those which exhibit a sharp melting behaviour below 170° C. are particularly preferred. The melting point is preferably above 70° C. The melt viscosity (measured with an IC cone and plate apparatus, ASTM 4287/83) of the semi-crystalline polyester is preferably from 0.1 to 10 Pa s (1 to 100 poise), particularly 0.1 to 7 Pa s (1 to 70 poise) at 200° C. and preferably 20 Pa s (200 poise) or less at 160° C. The viscosity is preferably 4 Pa s (40 poise) or more at 160° C. Most preferably, the semi-crystalline polyester has a melt viscosity of from 0.2 to 3 Pa s (20 to 30 poise) at 200° C. and from 4 to 15 Pa s (40 to 150 Poise) at 160° C. and is a brittle solid at ambient temperature with a sharp melting point in the range 110° C. to 170° C. Those having a sharp melting point up to 150° or up to 160° C. should also be mentioned.

The sharp melting point and low melt viscosities of the semi-crystalline polyesters for this invention assist in the flow of the powder coating before the curing reaction commences to provide smooth coatings. In contrast to EP-A-322807, the carboxylic acid group-containing semi-crystalline polyesters for this invention can be derived from aromatic polyacids as well as from aliphatic polyacids and can be used in amounts greater than 25 per cent by weight of total resin solids without adversely affecting powder storage stability. Moreover, a consequence of the lower acid numbers of the semi-crystalline polyesters for this invention, compared with those claimed in EP-A-322807, is that a less amount of relatively expensive curing agent is required to form a fully crosslinked polymer network in the final coating.

The carboxyl group-containing, amorphous polyesters that can be used in the present invention are based on a polycondensation reaction of aliphatic, cycloaliphatic and/or aromatic polyols, with aliphatic, cycloaliphatic and/or aromatic polycarboxylic acids or anhydrides, esters or acid chlorides thereof with an excess of acid over alcohol so as to form a polyester with an acid value of from 15 to 90 mg KOH per gram, more preferably above about 30 mg KOH per gram, and preferably no more than 70 mg KOH per gram, for example 30 to 45 mg KOH per gram. The polyols and polyacids can in general be selected from those described above with reference to the semi-crystalline polyesters. The polyester should preferably have a Tg of at least 35° C. and preferably below 100° C., more preferably from 40° C. to 75° C. In contrast to most of the semi-crystalline polyesters of this invention, the amorphous polyesters for use in this invention do not display a Tg below 30° C. when examined by D.S.C. The techniques that may be used for preparing carboxyl group-containing, amorphous polyesters are well known in the art. The acid value, molecular weight and glass transition temperature of the polyesters can be controlled by the choice of monomers, catalyst and reaction conditions used in the synthesis of these polyesters. For example, neopentyl glycol and terephthalic acid can be used as basic building blocks of a polyester for use in powder coatings which show hardness or abrasion resistance as key attributes. 1,6-Hexanediol or adipic acid can be chosen as monomers to impart flexibility and/or lower the Tg of a polyester, whereas trimethylolpropane may be chosen to impart a high degree of chemical reactivity in a polyester which may ultimately be incorporated in a powder for use at low stoving temperatures. (It must be remembered also, of course, that the choice of curing agent can be critical in determining the physical and visual effects shown in a thermoset powder coating.)

The amorphous polyester can also contain isophthalic acid, added at at least 10% by weight of the acid component used in the synthesis of the polyester. This affords coatings with improved weathering performance and, in particular, improved resistance to gloss reduction of the coating during outdoor exposure. Coatings in which isophthalic acid forms at least 30 to 40% of the acid component from which the amorphous polyester is derived may be sold as coatings with particular resistance to gloss reduction during exposure; if desired isophthalic acid may be the only polycarboxylic acid used in the amorphous polyester.

Thus, more especially the amorphous polyester is based on a condensation reaction of a polyol component comprising one or more aliphatic or cycloaliphatic polyols with an acid component comprising one or more aliphatic, cycloaliphatic or aromatic polycarboxylic acids or an anhydride, ester or acid chloride thereof, and wherein at least 10% by weight of the acid component is isophthalic acid.

Illustrative examples of such amorphous polyesters that can be used in this invention include commercially available polyesters such as Crylcoat E2988 and Uralec P5500.

The curing agent or curing agents that may be used with the semi-crystalline polyester or blend of semi-crystalline and amorphous polyesters comprises any organic compound that will react with free carboxyl groups on the polyesters to provide a crosslinked polymer network. The chemical functionality of the crosslinking agent should be on average at least two, preferably greater than two, up to and including six.

The powder coating compositions generally contain as binder 40–98% by weight of the carboxylic acid-functional polyester component and 2–60% by weight of the curing agent.

The powder coating compositions can for example be compositions containing 75 to 98%, preferably 85 to 95%, by weight polyester with a solid non-resinous curing agent, or "hybrid" powder coating compositions containing 30 to 90%, for example 40 to 85%, preferably 50 to 80%, by weight polyester with 10 to 70%, for example 15 to 60%, preferably 20 to 50%, by weight epoxy resin as a co-reactable curing agent. All of these compositions afford coatings with flow and levelling improved upon that achievable with powder compositions which do not contain the type of semi-crystalline polyesters disclosed in this invention.

When the powder coating composition is a hybrid powder coating composition containing up to 60% by weight epoxy resin, preferably 15–60%, as a co-reactable curing agent, the epoxy resin can for example be a polyglycidyl ether of an aromatic polyol such as bisphenol A. The epoxy resin should have an epoxy functionality greater than 1.0 and more preferably greater than 1.9. Generally the epoxy equivalent weight should be at least 170, but lower values may be possible in some cases; for example it may be 100 or more. Preferably the epoxy equivalent weight is less than 2300, especially less than 1000, for example from 150 to 1500, especially 150 to 800. Such epoxy resins may be produced, for example, by an etherification reaction between an aromatic or aliphatic polyol and epichlorohydrin or dichlorohydrin in the presence of an alkali such as caustic soda. The aromatic polyol may be, for example, bis(4-hydroxyphenyl)-2,2-propane (i.e. bisphenol A), bis(4-hydroxyphenyl)-1,1-ethane, bis(4-hydroxyphenyl)-1,1-isobutane, bis(4-hydroxy-t-butylphenyl)-2,2-propane, bis(2-hydroxynaphthyl)methane, 4,4'-dihydroxybenzophenone or 1,5-dihydroxynaphthalene. Polyepoxides based on polyols such as 1,2-ethanediol, 1,3-propanediol, 1,4-butanediol, 1,5-pentanediol, 1,6-hexanediol, diethylene glycol, triethylene glycol, polyethylene glycol or polypropylene glycol, for example diglycidyl ethers or condensed glycidyl ethers of such diols, can be used. Other oxirane group-containing polymers that can be used as the epoxy resin in hybrid powder coating compositions according to this invention include polyglycidyl-functional acrylic polymers or epoxy novolak resins.

The curing agent can, for example, be an epoxide, an activated hydroxyl or thiol compound or an oxazoline. The molar ratio of the functional groups of the curing agent(s), for example, epoxide, hydroxyl, thiol or oxacoline groups, to carboxylic acid groups in the polyester component or components is preferably 0.6 to 1.6:1.

An epoxide curing agent can for example be a low molecular weight, solid, non-resinous epoxide compound such as triglycidyl isocyanurate or triglycidyl 1,2,4-triazole-3,5-dione. Such a low molecular weight epoxide curing agent is preferably used at 2–12% by weight based on the polyester component of the powder composition.

An activated hydroxyl group-containing curing agent can for example be a beta-hydroxyalkylamide, a tris(2-hydroxyalkyl)isocyanurate such as tris(2-hydroxy-ethyl)isocyanurate, or an amine resin such as a urea-formaldehyde or melamine-formaldehyde resin. In the case of an amine resin, some or all of the hydroxyl groups can be etherified, for example hexamethoxymethylmelamine. A beta-hydroxyalkylamide curing agent preferably contains at least one, most preferably two, bis-(beta-hydroxy-alkyl)amide groups and can for example be of the formula:

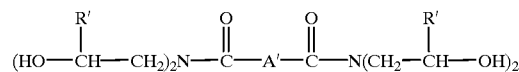

where R' is hydrogen or an alkyl group having 1 to 4 carbon atoms and A' is a divalent organic group, for example an alkylene or aralkylene group having 2 to 20 carbon atoms. An example of a preferred beta-hydroxyalkylamide curing agent for use in this invention is N,N,N',N'-tetrakis(2-hydroxyethyl)adipamide, i.e. where R'=H and A'=—(CH$_2$)$_4$— in the formula above. This and other possible curing agents are described and claimed in GB 1,489,485.

An oxazoline curing agent can for example have the formula:

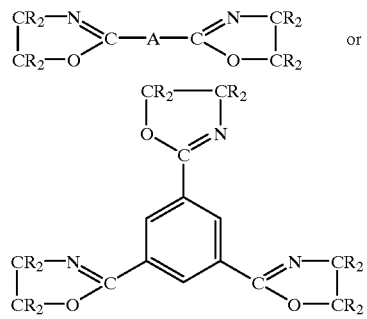

where each R independently is hydrogen or an alkyl group having 1 to 4 carbon atoms and A is a divalent organic group derived from an aliphatic or aromatic dicarboxylic acid HOOC—A—COOH, for example isophthalic acid.

The crosslinking agent chosen for use with the semi-crystalline polyesters of this invention is preferably one which remains chemically inert until the final stoving of the powder-coated substrate. A particularly preferred crosslinking agent for use with the semi-crystalline polyesters in this invention is Primid XL-552, a beta-hydroxyalkylamide group-containing crosslinking agent available from Rohm and Haas Co.

The powder coating composition can contain a catalyst for the curing reaction. For example, a strong acid such as p-toluenesulphonic acid can be a catalyst for use with an amino resin curing agent. Catalysts which may be used to accelerate the reaction between the carboxylic acid groups and epoxide groups present in an epoxy resin or in a polyepoxide curing agent such as triglycidyl isocyanurate include quaternary ammonium salts such as a tetraalkyl ammonium halide, quaternary phosphonium salts, phosphines, amines, imidazoles and metal salts. The catalyst, or a combination of two or more catalysts, when used in any of the powder compositions according to this invention is preferably present in amounts less than 5 per cent by weight, more preferably from about 0.2 to about 2 per cent by weight, based on the total weight of the powder coating composition.

The powder coating can be unpigmented but usually contains one or more pigments. It can contain other additives known for use in powder coatings, for example anti-popping, and anti-caking agents, a flow-promoting agent, antioxidant, a tribostatic charge-enhancing additive and a stabilizer such as a UV light-absorbing compound.

The present invention also provides a process for the preparation of a thermosetting powder coating composition, characterised in that a co-reactable particulate mixture of a carboxylic acid-functional polyester component comprising at least 5% by weight of at least one semi-crystalline polyester having an acid value of from 10 to 70 mg KOH per gram, and a hydroxy value of no more than 11 mg KOH per gram, and a curing agent and optionally one or more additives selected from pigments and other additives, is blended and comminuted.

The acid-functional polyester component usually comprises 5–100% by weight of the specified semi-crystalline polyester component and 0–95% by weight of at least one amorphous polyester having a Tg at least 30° C. and an acid number of 15 to 90 mg KOH per gram.

The ingredients of the powder coating compositions according to this invention can be blended by the processes known for producing powder coatings. Usually the ingredients are dry-blended at ambient temperature using a high-speed mixer and the resulting "premix" is passed through an extruder at a temperature sufficient to soften the non-crystalline resins (i.e. amorphous polyesters and epoxy resins) but insufficient to cause curing of the composition, for example a temperature in the range of 90–150° C. The composition is extruded as a sheet. When cool, the solid extrudate is broken into flakes and either resubmitted to the extrusion process or milled to the desired particle size. Liquid nitrogen can be bled into the grinding chamber to prevent agglomeration during milling. The particle size of the resulting powder coating composition is generally 10–120 micrometers, with a preferred mean particle size in the range 15–80 micrometers, preferably 25–80 micrometers.

In those powder formulations containing both semi-crystalline and amorphous polyesters and in which the semi-crystalline polyester component has both Tg's below 20° C., it is usually necessary to limit the semi-crystalline polyester component of the composition to less than 30 per cent by weight of total polymer solids. When the semi-crystalline polyester component has one or more Tg's between 25° C. and 35° C., the most preferred weight ratio of semi-crystalline polyester to amorphous polyester is from about 20:80 to about 35:65 respectively. This allows relatively trouble-free manufacture of powder coating compositions with adequate storage stability. Those carboxylic acid group-containing semi-crystalline polyesters displaying one or more Tg's above 40° C. may be used as the sole film-forming binder or in any combination with carboxylic acid group-containing amorphous polyesters in the powder coating compositions of this invention. Some difficulty is experienced in the processing of formulations containing semi-crystalline polyesters with one or more Tg's below 20° C. as the sole film-forming binder. In these instances, the hot melt extrudate can advantageously be collected in a stainless steel tray, allowed to cool to room temperature and then treated with liquid nitrogen before micronisation. Two or more hot-melt (i.e. at 90° C. to 130° C.) extrusions may be required for hybrid powder formulations containing semi-crystalline polyesters which have melting points greater than or equal to 130° C. This helps to maximise the homogeneity of the resultant powder composition and avoid "bit" formation and other surface defects in the final, cured coating. Alternatively or in addition to multiple hot-melt extrusions, these powder formulations may be subjected to a single hot-melt mixing process in a "cavity transfer"-type extruder.

Other variations in the manner in which the powder coating compositions of this invention are processed can be advantageously employed. It may be desirable, for example, to reduce further the size of the semi-crystalline polyester component before it is added to the other ingredients of the powder composition for dry-blending at ambient temperature. Size reduction of the semi-crystalline polyesters may be achieved with a fluid energy jet mill, for example, or a similar device which affords solid particles typically less than 50 micrometers in size.

Separately, or in combination with this technique, the hot-melt extruder operating conditions may be adjusted so component in the composition melts in the extruder before the extrudate is collected in a suitable receptacle and allowed to cool to room temperature or is subjected to annealing treatment.

It is well known in prior art processes that slow cooling of amorphous polymer extrudates can facilitate crystallisation. Annealing treatment, if it is employed, can involve holding the extrudate at a temperature below the melting point (Tm) of the original semi-crystalline component but above its "lower" Tg, i.e. that transition attributable to relatively unhindered molecular movement in its purely amorphous regions. Advantageously, during annealing treatment, the extrudate is held at a temperature below the Tm of the original semi-crystalline component and not more than 30° C. below the mid-point temperature between the Tm and "lower" Tg of the original semi-crystalline polyester. Most advantageously, annealing treatment occurs at a temperature corresponding to the mid-point temperature between the lowest Tg and the Tm of the semi-crystalline polyester. For example, in a powder composition containing a semi-crystalline polyester of Tm equal to 130° C. and "lower" Tg of −10° C. and which was hot-melt extruded under conditions which ensured full melting of this polyester, annealing treatment would advantageously take place at 70° C.

The extrudate can be annealed with hot water or by placing it in an oven maintained at the desired temperature. The required duration of the annealing treatment can be determined by periodically extracting small samples of extrudate and measuring their degree of crystallinity using D.S.C. analysis. The duration of annealing is usually not less than 20 minutes and can be allowed to continue for several hours. It must be ensured, of course, that the conditions used during extrusion and any post-extrusion annealing avoid onset of the cure reaction in the powder composition. Moreover, while it is possible to use crystallisation accelerators during the annealing process these also must not interfere with the further processing of the extrudate nor the powder or coatings subsequently obtained.

Such crystalline accelerators include low molecular weight compounds such as, for example, sodium benzoate or certain polyamides, and are well known to those versed in the art.

When the annealing process is complete, the extrudate is most advantageously allowed to cool to room temperature before being pulverised in the conventional manner.

The powder coating composition of the invention is preferably applied to a substrate by electrostatic spray but can alternatively be applied by fluidised bed. The coating is heat-cured at a temperature in the range 140° C. to 225° C., most preferably 160 to 200° C. The resultant coatings have improved flow, levelling and mechanical properties compared to powder coatings derived from powders based on an amorphous polyester as the only carboxylic acid-functional polyester.

When the amorphous polyester component has been derived from a variety of monomers rich in isophthalic acid, the powder composition according to this invention has faster thermal cure and affords a coating having better appearance and improved mechanical properties than can be obtained in the absence of the semi-crystalline polyesters according to this invention.

When the semi-crystalline polyesters according to this invention are used on their own or in combination with carboxylic acid group-containing amorphous polyesters in "hybrid" powders, the coating compositions cure faster than in the absence of semi-crystalline polyesters and the thermoset coatings have improved appearance and mechanical properties (especially flexibility). Some of the hybrid powder compositions disclosed in the Examples can be cured at a variety of temperatures from 160° C. to 200° C. providing coatings with a consistent surface appearance and with excellent mechanical properties. For example, certain hybrid powders described in the Examples are capable of affording coatings which resist a 10 Joule reverse impact and a "zero T" bend test on a 1 mm thick aluminium substrate.

EXAMPLE 1a

Semi-Crystalline Polyester Synthesis

Terephthalic acid (1474.3 g, 8.87 mol), 1,6-hexanediol (11246.7 g, 9.72 mol) and dibutyltin oxide (2.9 g, 11 mmol) were charged to a 5 liter, round-bottomed flask equipped with stirrer, a pre-condenser to minimise glycol loss, a water-cooled condenser, a Dean-Stark water trap, thermometer and a nitrogen gas inlet. The stirred reaction mixture was heated to 200° C. and maintained at this temperature for one hour before the temperature was raised during 1.5 hours to 250° C. The reaction was maintained at this temperature until the acid number of the polymer was below 5 mg KOH $g^{-1}$.

The "second stage" of the reaction was carried out as follows. The mixture was cooled to 170° C. before a sample was taken, dissolved in a suitable organic solvent containing a chemical indicator. This solution was titrated against alcoholic caustic potash solution, the end-point of the titration being noted and used to determine the difference (if any) between the hydroxy number of this polymer and its theoretical hydroxy number (41.4). The required supplement of 1,6-hexanediol was mixed with adipic acid (228.8 g, 1.57 mol) and the mixture charged to the reaction flask. The temperature of the stirred reaction mixture was raised to, and held at 250° C. until the polymer had an acid number of about 35 and a hydroxy number of less than 7. The reaction was maintained under a blanket of nitrogen gas throughout. As this stage about 340 g of water had collected in the Dean-Stark trap. The reaction mixture was cooled to 220° C. and maintained at this temperature for 45 minutes while a partial vacuum (of about 28 inches of mercury) was applied in order to remove any residual trace of water, unreacted monomer or oligomer. Finally, the vacuum was removed, the polymer cooled to 180° C., discharged into a stainless steel tray and allowed to cool to room temperature overnight affording a brittle, white solid with the following properties:

| | |
|---|---|
| ICI cone and Plate melt viscosity: | 7 poise at 200° C. |
| Acid number: | 33.1 mg/KOH/g |
| Hydroxy number: | 5 mg/KOH/g |
| Tg: | −12° C. and 30.0° C. |
| Tm: | 129° C. |
| Mn: | 3420 (theoretical) |

The theoretical number average molecular weight of the polymer is calculated according to the method described on page 13 of Bulletin 18–65, 1978, Amoco Chemical Corporation; "How to process better coating resins with Amoco IPA and TMA".

EXAMPLE 1b

Semi-Crystalline Polyester Synthesis

Terephthalic acid (1198.5 g, 7.22 mol) and 1,10-decanediol (1322.4 g, 7.6 mol) and dibutyltin oxide (0.41 g, 1.5 mmol) were reacted in a 5 liter, round-bottomed flask equipped as described in Example 1a. The "second stage" of the reaction involved addition of the required 1,10-decanediol supplement along with succinic acid (226.1 g, 1.9 mol). The final polymer product had the following properties:

| | |
|---|---|
| ICI Cone and Plate melt viscosity: | 11 poise at 200° C. |
| Acid number: | 69 mg KOH/g |
| Hydroxy number: | 4 mg KOH/g |
| Tg: | 29.8° C. |
| Tm: | 121° C. |
| Mn: | 1629 (theoretical) |

EXAMPLE 1c

Semi-Crystalline Polyester Synthesis 1,4-Cyclohexanedicarboxylic acid (1210.88 g, 7.0 mol), trimethylolpropane (59.4 g, 0.4 mol) and 1,6-hexanediol (934.6 g, 7.9 mol) and dibutylin oxide (2.81 g, 11 mmol) were reacted in a 5 liter, round-bottomed flask equipped as described in Example 1a. The "second stage" of the reaction involved the required addition of a 1,6-hexanediol and trimethylolpropane supplement along with 1,12-dodecanedioic acid (608.0 g, 2.6 mol). The final polymer product had the following properties:

| | |
|---|---|
| ICI Cone and Plate melt viscosity: | 25 poise at 200° C. |
| Acid number: | 50 mg KOH/g |
| Hydroxy number: | 3.5 mg KOH/g |
| Tg: | −9° C. and 16° C. |
| Tm: | 102° C. |
| Mn: | 2840 (theoretical) |

EXAMPLE 1d

Semi-Crystalline Polyester Synthesis

Terephthalic acid (937.90 g, 5.65 mol), 1,6-hexanediol (814.20 g, 6.90 mol), trimethylolpropane (20.25 g, 0.15 mol), adipic acid (292.00 g, 2.00 mol) and dibutyltin oxide (2.06 g, 8 mmol), were charged to a 5 liter, round-bottomed flask equipped as described in Example 1.a. The reaction mixture was heated to 190° C. and maintained at this temperature for 40 minutes before the temperature was raised during two hours to 250° C. The reaction was maintained at this temperature until the hydroxyl number of the polymer was below 5 mg KOH $g^{-1}$. The polymer product had the following properties:

| | |
|---|---|
| ICI Cone and Plate melt viscosity: | 28 poise at 200° C. |
| Acid number: | 28 mg KOH/g |
| Hydroxy number: | 3 mg KOH/g |
| Tg: | 34.6° C. |
| Tm: | 115° C. |
| Mn: | 4017 (theoretical) |

EXAMPLE 1e (Comparative Example)

Semi-Crystalline Polyester Synthesis

This Example illustrates the synthesis of a semi-crystalline polyester of higher acid number than the semi-crystalline polyesters of this invention.

Dodecanedioic acid (1840.00 g, 8.0 mol), 1,6-hexanediol (472.00 g, 4.0 mol) and dibutyltin oxide (2.31 g, 9 mmol) were reacted in a 5 liter, round-bottomed flask equipped as described in Example 1.a. Reaction was complete after 3.5 hours and no further hexanediol addition was required. The final polymer product obtained was a white, brittle solid with the following properties:

| | |
|---|---|
| ICI Cone and Plate melt viscosity: | 0.1 poise at 200° C. |
| Acid number: | 210.4 mg KOH/g |
| Hydroxy number: | 3 mg KOH/g |
| Tg: | undetectable |
| Tm: | 60° C. |
| Mn: | 532 (theoretical) |

EXAMPLE 2a

Amorphous Polyester Synthesis

An acid-functional, amorphous polyester was prepared from the following mixture of ingredients:

| Ingredient | Parts by weight/g |
|---|---|
| Terephthalic acid | 430.61 |
| Isophthalic acid | 874.67 |
| Adipic acid | 35.51 |
| Neopentyl glycol | 783.41 |

The terephthalic acid, isophthalic acid and neopentyl glycol were charged to a 5 liter, round-bottomed flask equipped as described in Example 1.a. Dibutyltin oxide (2.1 g, 8 mmol) was charged and the mixture was stirred under nitrogen at 200° C. for 30 minutes before the temperature was raised to 250° C. over one hour. The reaction mixture was maintained at this temperature for four hours by which time it had an acid number of 5. The reaction mixture was then cooled to 200° C., treated with the adipic mined according to the method described in Example 1.a.) before the temperature of the reaction mixture was raised to, and maintained at 250° C. for 3.5 hours. The final polymer product had the following properties:

| | |
|---|---|
| ICI Cone and Plate melt viscosity: | 72 poise at 200° C. |
| acid number: | 30.2 |
| Tg: | 68.5° C. |

EXAMPLE 2b

Amorphous Polyester Synthesis

An acid-functional, amorphous polyester was prepared in a similar manner to that described in Example 2.a. using the following mixture of ingredients:

| Ingredient | Parts by weight/g |
|---|---|
| Terephthalic acid | 748.42 |
| Isophthalic acid | 795.76 |
| Adipic acid | 41.94 |
| Trimethylol propane | 31.52 |
| Neopentyl glycol | 884.48 |

Dibutyltin oxide (2.50 g, 9 mmol) was used as a catalyst in the reaction. The final polymer product had the following properties:

| | |
|---|---|
| ICI Cone and Plate melt viscosity: | 29 Poise at 200° C. |
| Acid number: | 37.3 |
| Tg: | 60.0° C. |

The following Examples are of thermosetting powder coating compositions prepared with carboxylic acid group-containing, semi-crystalline polyesters, carboxylic acid group-containing amorphous polyesters and polyepoxides. Unless otherwise stated, all powders were electrostatically sprayed onto chromate-pretreated, 2 mm thick aluminium panels. The film thickness of the cured powder coatings was about 50 to 70 micrometers. Film properties for the resultant coating are as shown in Table 1. Where a—is shown in Table 1, the relevant property was not measured for that coating.

EXAMPLE A.

| Thermosetting Powder Coating Composition. | |
|---|---|
| Ingredient | Weight in g |
| Carboxylic acid group-containing, semi-crystalline polyester of Example 1.a. | 192.30 |
| Carboxylic acid group-containing, amorphous polyester of Example 2.b. | 400.00 |
| Primid XL-552[1] | 31.77 |
| Titanium dioxide | 364.82 |
| Blanc Fixe | 64.35 |
| Modaflow III[2] | 10.73 |
| Benzoin | 2.15 |
| Irganox 1010[3] | 2.15 |

[1]Primid XL-552 is a hydroxy-functional cross-linking agent available from Rohm & Haas Co.
[2]Modaflow III is an acrylic-based flow aid available from Monsanto Co.
[3]Irganox 1010 is a polyphenol stabiliser that inhibits oxidation and is available from Ciba-Geigy.

The ingredients were blended at room temperature in a high speed mixer for five minutes, then melt-blended on a Buss single-screw extruder at 130° C. The extrudate was chilled, flaked, ground in a micromill and classified through a 106 micrometer mesh.

Coated panels were baked at 200° C. for 15 minutes. The coating were very smooth, free of "orange peel" and had good mechanical properties.

EXAMPLE A (i) (Comparative Example)

Thermosetting Powder Coating Composition

This Example shows the effect of including a powder coating composition a semi-crystalline polyester of higher acid number than the maximum specified according to this invention.

| Ingredient | weight in g |
|---|---|
| Carboxylic acid group-containing, semi-crystalline polyester of Example 1.e. | 69.64 |
| Carboxylic acid group-containing, amorphous polyester of Example 2.b. | 464.29 |
| Primid XL-552 | 50.26 |
| Titanium dioxide | 400.00 |
| Modaflow III | 9.84 |
| Benzoin | 3.00 |
| Irganox 1010 | 2.80 |

The powder was prepared according to the general instructions given in Example A.

Note that while the semi-crystalline polyester is present at only 15% by weight based on total resin solids, it nevertheless demands a relatively large amount of cross-linker to compensate for the high acid number (210.4 mg KOH/g) of the polymer. Moreover, the storage stability of the powder at 30° C. was so poor that it compacted to an unusable, solid lump after only three days. Otherwise, coated panels baked at 200° C. for 15 minutes afforded coating which were hard, glossy and smooth and exhibited good mechanical properties.

EXAMPLE A (ii) (Comparative Example)

Thermosetting Powder Coating Composition

This Example shows the detrimental effect on film flow, levelling and mechanical properties when a semi-crystalline polyester of this invention is omitted from the powder coating composition.

| Ingredient | weight in g |
|---|---|
| Carboxylic acid group-containing, amorphous polyester of Example 2.b. | 551.90 |
| Primid XL-552 | 32.36 |
| Titanium dioxide | 341.64 |
| Blanc fixe | 60.10 |
| Modaflow III | 10.00 |
| Benzoin | 2.00 |
| Irganon 1010 | 2.00 |

The powder was prepared according to the general instructions given in Example A.

Coated panels were baked at 200° C. for 15 minutes. In contrast to the coatings obtained in Example A, these had significantly poorer flow, levelling and mechanical properties.

EXAMPLE B.

Thermosetting Powder Coating Composition

| Ingredient | weight/g |
|---|---|
| Carboxylic acid group-containing, semi-crystalline polyester of Exanple 1.a. | 500.00 |
| Triglycidyl isocyanurate (TGIC) | 39.50 |
| Titanium dioxide | 364.18 |
| Benzoin | 1.10 |
| Modaflow III | 5.52 |
| Tetra-n-butylammonium bromide | 0.15 |

The tetra-n-butylammonium bromide (a cure catalyst) was dispersed in a stirred melt of the carboxylic acid group-containing, semi-crystalline polyester before the mixture was allowed to cool to room temperature. The solid was then pulverised and added to the other ingredients which were processed to a thermosetting powder as described in Example A.

Coated panels were baked at 200° C. for 15 minutes. The coating showed excellent flow and levelling.

EXAMPLE C.

Thermosetting Powder Coating Composition

| Ingredient | Weight in g |
|---|---|
| Carboxylic acid group-containing, semi-crystalline polyester of Example 1.a. | 310.89 |
| Carboxylic acid group-containing, semi-crystalline polyester of Example 1.b. | 133.24 |
| Benzene-1,3,5-tris(4,5-dihydro-4,4-dimethyl-1,3-oxazole) | 143.86 |
| Titanium dioxide | 400.00 |
| Modaflow III | 10.00 |
| Benzoin | 2.00 |

The powder was prepared according to the general instructions given in Example A except that the blended ingredients were melt-blended at 140° C.

Coated panels were baked at 200° C. for 20 minutes. The coatings showed good flow and good overall appearance.

EXAMPLE D.

Thermosetting Powder Coating Composition

| Ingredient | Weight in g |
|---|---|
| Carboxylic acid group-containing, semi-crystalline polyester of Example 1.b. | 58.00 |
| Carboxylic acid group-containing, semi-crystalline polyester of Example 1.c. | 58.00 |
| Carboxylic acid group-containing, amorphous polyester of Example 2.a. | 464.00 |
| TGIC | 46.69 |
| Titanium dioxide | 441.74 |
| Modaflow III | 10.81 |
| Tinuvin 900[1] | 2.16 |
| Irganox 1010 | 2.16 |
| Benzoin | 2.16 |

[1]Tinuvin 900 is an alkyl-substituted benzotriazole UV light absorber available from Ciba-Geigy.

The powder was prepared according to the general instructions given in Example A. The coated panels were baked at 200° C. for 12 minutes.

Coatings showed excellent flexibility and impact resistance and were attractive in overall appearance.

EXAMPLE E.

| Thermosetting Powder Coating Composition | |
|---|---|
| Ingredient | Weight in g |
| Crylcoat E2988[1] | 425.2 |
| Carboxylic acid group-containing, semi-crystalline polyester of Example 1.a. | 182.2 |
| Primid XL-552 | 28.6 |
| Titanium dioxide | 350.0 |
| Modaflow III | 10.0 |
| Irganox 1010 | 2.0 |
| Benzoin | 2.0 |

[1]Crylcoat E2988 is a carboxylic acid group-containing, amorphous polyester available from Ucb., Belgium.

The powder was prepared according to the general instructions given in Example A except Aerosil TS100 (a silica dry-flow aid available from Degussa) was added to the ground extrudate at a level of 0.02 per cent by weight before this mixture was micronised.

Coated panels were baked at 200° C. for 15 minutes. Coatings displayed good mechanical properties and were smooth in appearance.

EXAMPLE F.

Thermosetting Powder Coating Composition

| Thermosetting Powder Coating Composition | |
|---|---|
| Ingredient | Weight in g |
| Crylcoat E2988 | 419.9 |
| Carboxylic acid group-containing, semi-crystalline polyester of Example 1.a. | 180.0 |
| TGIC | 36.1 |
| Titanium dioxide | 350.0 |
| Irganox 1010 | 2.0 |
| Benzoin | 2.0 |

The powder was prepared according to the instructions given in Example E. Coated panels were baked at 200° C. for 15 minutes.

Coatings were attractive, gave good substrate edge coverage and displayed good impact resistance.

EXAMPLE G.

| Thermosetting Powder Coating Compositions | |
|---|---|
| Ingredient | Weight in g |
| Uralac P5500[1] | 418.5 |
| Carboxylic acid group-containing semi-crystalline polyester of Example 1.a. | 179.5 |
| Primid XL-552 | 38.2 |
| Titanium dioxide | 350.0 |
| Modaflow III | 10.0 |
| Irganox 1010 | 2.0 |

[1]Uralac P5500 is a carboxylic acid group-containing, amorphous polyester available from DSM Resins b.v.

Method (a)

The powder was prepared according to the instructions given in Example E.

Coated panels were baked at 200° C. for 15 minutes. Coatings displayed good flexibility and impact resistance.

Method (b)

The ingredients were blended at room temperature in a high speed mixer for five minutes, then melt blended on an APV Machinery Ltd. MPC 30 twin screw extruder with barrel temperature 135° C. and other operating conditions adjusted so as to maintain a torque of 50% during powder extrusion. These conditions ensured that the semi-crystalline polyester component in the composition melted during extrusion.

The extrudate was collected as sheets no greater than 5 mm in depth in shallow, stainless steel trays which were immediately transferred to an oven maintained at 70° C. After 20 minutes, the trays were removed and their contents allowed to cool to room temperature during 16 hours. The slabs of extrudate were then pulverised in the conventional manner.

The resulting powder was electrostatically sprayed onto earthed, aluminium panels. These were baked at 200° C. for 15 minutes and afforded coatings with an excellent smooth appearance.

EXAMPLE H.

| Thermosetting Powder Coating Composition | |
|---|---|
| Ingredient | Weight in g |
| Uralac P5500 | 410.1 |
| Carboxylic acid group-containing, semi-crystalline polyester of Example 1.a. | 175.8 |
| TGIC | 50.1 |
| Titanium dioxide | 350.0 |
| Irganox 1010 | 2.0 |
| Benzoin | 2.0 |

The powder was prepared according to the instructions given in Example E.

Coated panels were baked at 200° C. for 15 minutes. The coatings were attractive in appearance and showed good mechanical properties.

EXAMPLE I.

| Thermosetting Powder Coating Composition | |
|---|---|
| Ingredient | Weight in g |
| Carboxylic acid group-containing, semi-crystalline polyester of Example 1.a. | 9.5 |
| DER 671[1] | 107.5 |
| Epikote 3003-4F10[2] | 75.0 |
| Crylcoat 2564[3] | 17.0 |
| Titanium dioxide | 354.0 |
| Benzoin | 4.0 |
| Polyethylene wax AC-8A[4] | 3.0 |

[1]DER 671 is an epoxy resin with a 1,2-epoxy equivalency of about 2, an epoxy equivalent weight of about 512 available from Dow Chemicals.
[2]Epikote 3003-4F10 is a resin "masterbatch" of the flow aid "Acronal 4F" (10% by weight) dispersed in epoxy resin Epikote 3003 (90%) and available from Shell U.K.
[3]Crylcoat 2564 is a masterbatch containing catalyst available from Ucb, Belgium.
[4]Polyethylene wax AC-8A is available from Allied Corporation, U.S.A.

The ingredients were blended at room temperature in a high speed mixer for five minutes, then melt-blended on a Buss single-screw extruder with barrel temperature 90° C., screw temperature 70° C. and screw speed 80 r.p.m. The extrudate was cooled, pulverised and re-submitted for hot melt extrusion, the extrudate this time being cooled, flaked and treated with Aerosil TS100 at 0.2 per cent by weight of total flake. The mixture was then micronised and classified through a 106 μm mesh.

Coated panels were baked at 200° C. for ten minutes and at 170° C. for 20 minutes. Coatings showed excellent appearance (particularly at 40 micrometers film thickness) and had good solvent resistance.

EXAMPLE J.

| Thermosetting Powder Coating Composition | |
|---|---|
| Ingredient | Weight in g |
| Carboxylic acid group-containing, semi-crystalline polyester of Example 1.a. | 126.0 |
| Uralac P2450[1] | 295.9 |
| DER 671 | 125.1 |
| Epikote 3003-4F10 | 75.0 |
| Crylcoat 2564 | 17.0 |
| Titanium dioxide | 354.0 |
| Benzoin | 4.0 |
| Polyethylene wax AC-8A | 3.0 |

[1]Uralac P2450 is a carboxylic acid group-containing, amorphous polyester available from DSM Resins b.v.

The powder was prepared according to the instructions given in Example I.

Coated panels were baked at 200° C. for 10 minutes. Coatings were hard, smooth and showed good flexibility.

EXAMPLE J (i) (Comparative Example)

This Example shows the detrimental effect on appearance and mechanical properties when a semi-crystalline polyester of this invention is omitted from the powder coating composition.

| Thermosetting Powder Coating Composition | |
|---|---|
| Ingredient | Weight in g |
| Carboxylic acid group-containing, amorphous polyester of Example 2.a. | 128.4 |
| Uralac P2450 | 293.5 |
| DER 671 | 125.1 |
| Epikote 3003-4F10 | 75.0 |
| Crylcoat 2564 | 17.0 |
| Titanium dioxide | 354.0 |
| Benzoin | 4.0 |
| Polyethylene wax AC-8A | 3.0 |

The powder was prepared according to the general instructions given in Example I.

Coated panels were baked at 200° C. for 10 minutes. Since the powder formulation above does not contain a semi-crystalline polyester of the type described in this invention, the coatings obtained were less smooth in appearance and had significantly poorer mechanical properties.

EXAMPLE K.

| Thermosetting Powder Composition | |
|---|---|
| Ingredient | Weight in g |
| Carboxylic acid group-containing, semi-crystalline polyester of Example 1.a. | 106.4 |
| Uralac P2695[1] | 259.7 |
| DER 671 | 180.9 |
| Epikote 3003-4F10 | 75.0 |
| Crylcoat 2564 | 4.0 |
| Titanium dioxide | 354.0 |
| Benzoin | 4.0 |
| Polyethylene wax AC-8A | 3.0 |

[1]Uralac P2695 is a carboxylic acid group-containing, amorphous polyester available from DSM Resins b.v.

The powder was prepared according to the instructions given in Example I.

Coated panels were baked at 200° C. for 10 minutes. The coatings showed excellent flow and mechanical properties.

EXAMPLE L.

| Thermosetting Powder Composition | |
|---|---|
| Ingredient | Weight in g |
| Carboxylic acid group-containing, semi-crystalline polyester of Example 1.a. | 126.0 |
| Crylcoat 316[1] | 186.9 |
| Uralac P2450 | 96.0 |
| Crylcoat 2564 | 30.0 |
| DER 671 | 125.1 |
| Epikote 3003-4F10 | 75.0 |
| Mowital B.3OH[2] | 5.0 |
| Titanium dioxide | 350.0 |
| Benzoin | 4.0 |
| Polyethylene wax AC-8A | 3.0 |

-continued

Thermosetting Powder Composition

| Ingredient | Weight in g |

[1]Crylcoat 316 is a carboxylic acid group-containing, amorphous polyester available from U.c.b., Belgium.
[2]Mowital B.30H is a poly(vinyl butyral) available from Hoechst Resins.

The "premixed" powder composition was extruded twice at 90° C. on a Buss single-screw extruder with a screw speed setting of 85 r.p.m.

Coated panels were baked at three different stoving schedules (six minutes at 200° C., 15 minutes at 170° C., and 20 minutes at 160° C.) giving fully cured coatings indistinguishable from each other in appearance and possessing excellent flexibility and impact resistance.

EXAMPLE M.

Thermosetting Powder Composition

| Ingredient | Weight in g |
| --- | --- |
| Carboxylic acid group-containing, semi-crystalline polyester of Example 1.d. | 106.8 |
| Uralac P3042[1] | 260.5 |
| DER 671 | 179.8 |
| Epikote 3003-4F10 | 75.0 |
| Crylcoat 2564 | 17.0 |
| Titanium dioxide | 350.0 |
| Benzoin | 4.0 |
| Polyethylene wax AC-8A | 3.0 |

[1]Uralac P3042 is a carboxylic acid group-containing amorphous polyester available from D.S.M. Resins b.v.

The powder was prepared according to the instructions given in Example L.

Coated panels were baked at 200° C. for ten minutes or at 170° C. for 20 minutes with cured coatings showing excellent flow and mechanical properties.

TEST PROCEDURES (1) The impact resistance was measured with a Gardner Variable Impact Tester. Chromate pre-treated aluminium panels (150×100×2 mm) were subjected to increasing amounts of impact on the coated side (forward impact) and uncoated side (reverse impact) with a ⅝" diameter steel tub. The test was conducted 24 hours after the coating had cured. The deformed coating was checked for holes, tears and cracks. The impact test is described more thoroughly in ASTM D2794.

(2) Pencil hardness was measured with Berol Venus pencils. Each pencil was hand-held at 45° to the panel and pushed across the surface with reasonable force. The grade of pencil lead (6B to 6H) required to scratch the coating was recorded.

(3) The 20°, 60° and 85° gloss readings were obtained with a gloss meter manufactured by the Gardner Instrument Company, according to ASTM D523-85.

(4) The zero-T bend test is performed by bending the uncoated side of a 1 mm thick aluminium panel through 180° so that two uncoated sides of the panel meet flat against each other. The coating is inspected under magnification (×10) for pin-holes, tears and cracks with evidence for any of these indicating failure of the test. One-T and two-T tests can be performed on the same panel by folding the original bend further through 180°.

(5) Powder storage stability was determined by storing 3 g. of powder in a cylindrical, glass vial of diameter 20 mm and length 50 mm in a constant temperature oven set at 40° C. for 10 days. The vial is then removed from the oven and inverted. The powder passes the test if it flows freely or if any agglomerates present are disaggregated by gentle tapping of the vial.

(6) The solvent resistance test involves rubbing a pad of cotton wool soaked in acetone firmly across the surface of a coating at least 30 times in not more than 30 seconds. The pad was kept saturated with acetone throughout the test which was repeated and the number of rubs recorded at the point where the dried coating showed any softening or loss of gloss.

(7) The salt spray test involved scribing an "X" on one side of a panel which had cured coating on both sides and a barrier coating of chlor-rubber on the exposed edges. The scribe penetrated the coating to the panel. The panel was then exposed to a salt spray fog at 38° C. for 500 hours. Adhesive tape was placed over the dry scribe, the tape pulled off at a 45° angle and any creepage from the scribe mark measured. The test procedure is more fully described in ASTM D117-73.

TABLE 1

| Example | Stability | Gloss 20° | 60° | 85° | Pencil Hardness | Impact Direct | Resistance J Reverse | 500 hour Salt Spray | Acetone Resistance | T-band |
| --- | --- | --- | --- | --- | --- | --- | --- | --- | --- | --- |
| A | Pass | 65 | 87 | 99 | H | 10 | 10 | 1/8" | 400 | — |
| B | Pass | 50 | 84 | 93 | HB | 10 | 10 | 1/4" | 380 | — |
| C | Pass | 58 | 82 | 93 | HB | 5 | 5 | 1/4" | 410 | — |
| D | Pass | 60 | 84 | 94 | H | 10 | 10 | 1/4" | 380 | — |
| E | Pass | 61 | 85 | 94 | 2H | 2.5 | 2.5 | 1/8" | 400 | — |
| F | Pass | 58 | 83 | 97 | H | 5 | 5 | 1/16" | 390 | — |
| G | Pass | 63 | 85 | 98 | 2H | 5 | 5 | 1/4" | 410 | — |
| H | Pass | 62 | 84 | 94 | HB | 2.5 | 2.5 | 1/8" | 410 | — |
| I | Pass | 60 | 84 | 91 | H | — | 10 | — | 180 | OT |
| J | Pass | 63 | 86 | 93 | H | — | 10 | — | 190 | IT |
| K | Pass | 59 | 83 | 93 | H | — | 10 | — | 200 | 2T |
| L | Pass | 64 | 86 | 95 | H | — | 10 | — | 190 | OT |
| M | Pass | 64 | 87 | 96 | H | — | 10 | — | 190 | OT |

What is claimed is:

1. A thermosetting powder coating composition comprising as binder a co-retractable particulate mixture of a carboxylic acid-functional polyester component and a curing agent having groups reactive with carboxylic acid groups, wherein the carboxylic acid-functional component comprises:
   (A) at least one semi-crystalline polyester having one or more Tg values no more than 55° C., a sharp melting point of from 50° C. to 200° C., an acid value of from 10 to 70 mg KOH per gram and a number average molecular weight of at least 1600, in an amount of from about 5% to about 90% by weight, and
   (B) at least one amorphous polyester containing from 65 to 100% by weight of isophthalic acid, calculated on all of the acid constituents, having a Tg of at least 30° C. and an acid number of from 15 to 90 mg KOH per gram in an amount of from about 10% to about 95% by weight, the weight of the amorphous polyester being calculated on the combined weight of the total polyesters (A) and (B).

2. A composition according to claim 1, wherein the semi-crystalline polyester has a number average molecular weight of from 1600 to 12,000.

3. A composition according to claim 2, wherein the semi-crystalline polyester has a number average molecular weight of from 2500 to 4500.

4. A composition according to claim 1 wherein the semi-crystalline polyester has an acid value of 28 to 45 mg KOH per gram.

5. A composition according to claim 1 wherein the semi-crystalline polyester has a hydroxy value of no more than 11 mg KOH per gram.

6. A composition according to claim 1 or claim 5, wherein the semi-crystalline polyester has a melt viscosity of from 0.1 to 7 Pa s (1 to 70 poise) at 200° C. and from 4 to 20 Pa s (40 to 200 poise) at 160° C.

7. A composition according to claim 1, wherein the carboxylic acid-functional polyester component comprises 10–40% by weight of semi-crystalline polyester (A) and 60–90% by weight of amorphous polyester (B).

8. A composition according to claim 1 or claim 5, wherein the curing agent is a polyepoxide and the molar ratio of epoxide groups in the curing agent to carboxylic acid groups in the polyester component is from 0.6 to 1.6:1.

9. A composition according to claim 8, wherein the polyepoxide is an epoxy resin of epoxide equivalent weight 150–1000 and the weight ratio of epoxy resin to polyester component is from 15:85 to 60:40.

10. A composition according to claim 8, wherein the curing agent is a solid non-resinous polyepoxide.

11. A composition according to claim 1 or claim 5, wherein the curing agent is a bis(beta-hydroxyalkylamide).

12. A composition according to claim 1, wherein the curing agent is selected from the group consisting of epoxy resins of epoxide equivalent weight 150–1000 other than solid non-resinous polyepoxides used in a weight ratio of epoxy resin to polyester component of 15:85 to 60:40, solid non-resinous polyepoxides, and bis(beta-hydroxyalkylamides).

13. A composition according to claim 12, wherein the semi-crystalline polyester has a number average molecular weight of at least 2500.

14. A composition according to claim 12, wherein the semi-crystalline polyester has a hydroxy value of no more than 11 mg KOH per gram.

15. A process for coating a substrate wherein the thermosetting powder coating composition of claim 1 is applied to the substrate and is heated on the substrate to fuse and cure the coating.

16. A substrate when coated by a process according to claim 15.

17. A process of preparing a thermosetting powder coating composition comprising the steps of: (1) blending or mixing a co-reactable particulate mixture of a carboxylic acid-functional polyester component and a curing agent having groups reactive with carboxylic acid groups, said mixture optionally also including one or more pigments or additives; and (2) comminuting said blend or mixture, wherein the carboxylic acid-functional component comprises:
   (A) at least one semi-crystalline polyester having one or more Tg values no more than 55° C., a sharp melting point of from 50° C. to 200° C., an acid value of from 10 to 70 mg KOH per gram and a number average molecular weight of at least 1600 in an amount of from about 5% to about 90% by weight, and
   (B) at least one amorphous polyester containing from 65 to 100% by weight of isophthalic acid, calculated on all of the acid constituents, having a Tg of at least 30° C. and an acid number of from 15 to 90 mg KOH per gram in an amount of from about 10% to about 95% by weight, the weight of the amorphous polyester being calculated on the combined weight of the total polyesters (A) and (B).

18. A process according to claim 17, wherein after melting in the blending step the semi-crystalline polyester is recrystallised by an annealing treatment.

19. A thermosetting powder coating composition prepared according to claim 17.

* * * * *